(12) United States Patent
Lee

(10) Patent No.: US 11,386,656 B2
(45) Date of Patent: Jul. 12, 2022

(54) DEVICE AND METHOD OF HANDLING VIDEO CONTENT ANALYSIS

(71) Applicant: Moxa Inc., New Taipei (TW)

(72) Inventor: Wei-Yu Lee, New Taipei (TW)

(73) Assignee: Moxa Inc., New Taipei (TW)

( * ) Notice: Subject to any disclaimer, the term of this patent is extended or adjusted under 35 U.S.C. 154(b) by 184 days.

(21) Appl. No.: 16/927,945

(22) Filed: Jul. 13, 2020

(65) Prior Publication Data
US 2021/0319225 A1    Oct. 14, 2021

Related U.S. Application Data

(60) Provisional application No. 63/006,737, filed on Apr. 8, 2020.

(51) Int. Cl.
*G06V 20/40* (2022.01)
*G06K 9/62* (2022.01)
*G06N 3/04* (2006.01)
*G06N 3/08* (2006.01)
*G06V 10/34* (2022.01)

(52) U.S. Cl.
CPC .......... *G06V 20/41* (2022.01); *G06K 9/6262* (2013.01); *G06N 3/0454* (2013.01); *G06N 3/08* (2013.01); *G06V 10/34* (2022.01); *G06V 20/44* (2022.01)

(58) Field of Classification Search
CPC ........ G06V 20/41; G06V 10/34; G06V 20/44; G06K 9/6262; G06N 3/0454; G06N 3/08
See application file for complete search history.

(56) References Cited

U.S. PATENT DOCUMENTS

| | | | |
|---|---|---|---|
| 10,650,245 B2 * | 5/2020 | Swaminathan | G06V 10/82 |
| 10,861,168 B2 * | 12/2020 | Yu | G06N 3/0454 |
| 2011/0134242 A1 * | 6/2011 | Loubser | G06V 20/52 |
| | | | 348/143 |

(Continued)

FOREIGN PATENT DOCUMENTS

| | | |
|---|---|---|
| CN | 103886305 A | 6/2014 |
| CN | 105574550 A | 5/2016 |
| TW | M592541 U | 3/2020 |

OTHER PUBLICATIONS

Vishnu, C., et al. "Detection of motorcyclists without helmet in videos using convolutional neural network." 2017 International Joint Conference on Neural Networks (IJCNN). IEEE, 2017. (Year: 2017).*

*Primary Examiner* — Utpal D Shah
(74) *Attorney, Agent, or Firm* — Winston Hsu

(57) ABSTRACT

A computing device for handling video content analysis, comprises a preprocessing module, for receiving a first plurality of frames and for determining whether to delete at least one of the first plurality of frames according to an event detection, to generate a second plurality of frames according to the determination for the first plurality of frames; a first deep learning module, for receiving the second plurality of frames and for determining whether to delete at least one of the second plurality of frames according to a plurality of features of the second plurality of frames, to generate a third plurality of frames according to the determination for the second plurality of frames; and a second deep learning module, for receiving the third plurality of frames, to generate a plurality of prediction outputs of the third plurality of frames.

18 Claims, 9 Drawing Sheets

(56) References Cited

U.S. PATENT DOCUMENTS

| | | | |
|---|---|---|---|
| 2018/0150684 A1* | 5/2018 | Wang | G06N 3/0454 |
| 2018/0254070 A1 | 9/2018 | Song | |
| 2019/0034734 A1* | 1/2019 | Yen | G06N 3/0454 |
| 2019/0180469 A1* | 6/2019 | Gu | G06V 40/167 |
| 2019/0297326 A1* | 9/2019 | Reda | G06N 20/10 |
| 2019/0392591 A1* | 12/2019 | Lee | G01V 8/10 |
| 2020/0151309 A1* | 5/2020 | Thuillier | G06V 40/1365 |
| 2020/0175352 A1* | 6/2020 | Cha | G06T 7/001 |
| 2021/0104086 A1* | 4/2021 | Wang | G06N 3/084 |
| 2022/0057958 A1* | 2/2022 | Patriarca | G06F 3/0679 |

* cited by examiner

DEVICE AND METHOD OF HANDLING VIDEO CONTENT ANALYSIS

CROSS REFERENCE TO RELATED APPLICATIONS

This application claims the benefit of U.S. Provisional Application No. 63/006,737 filed on Apr. 8, 2020, which is incorporated herein by reference.

BACKGROUND OF THE INVENTION

1. Field of the Invention

The present invention relates to a device and a method used in a multimedia system, and more particularly, to a device and a method of handling video content analysis.

2. Description of the Prior Art

Video content analysis aims to identify (e.g., detect or determine) temporal events and/or spatial events (e.g., targets) in frames of a video or a streaming. The video content analysis has been applied to solve problems in several applications such as detection (e.g., tamper detection, anomaly detection), video tracking (e.g., person re-identification), traffic monitoring (e.g., people/vehicles counting), etc. Several methods in the prior art are proposed for the video content analysis, but the methods achieve better performance at cost of high computational complexity. It is difficult to implement hardware computing the all frames of the video by the methods, when computing power of the hardware is insufficient. Thus, a method for handling the video content analysis with low computational complexity is needed.

SUMMARY OF THE INVENTION

The present invention therefore provides a device and a method for handling video content analysis to solve the abovementioned problem.

A computing device for handling video content analysis, comprises a preprocessing module, for receiving a first plurality of frames and for determining whether to delete at least one of the first plurality of frames according to an event detection, to generate a second plurality of frames according to the determination for the first plurality of frames; a first deep learning module, coupled to the preprocessing module, for receiving the second plurality of frames and for determining whether to delete at least one of the second plurality of frames according to a plurality of features of the second plurality of frames, to generate a third plurality of frames according to the determination for the second plurality of frames; and a second deep learning module, coupled to the first deep learning module, for receiving the third plurality of frames, to generate a plurality of prediction outputs of the third plurality of frames.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
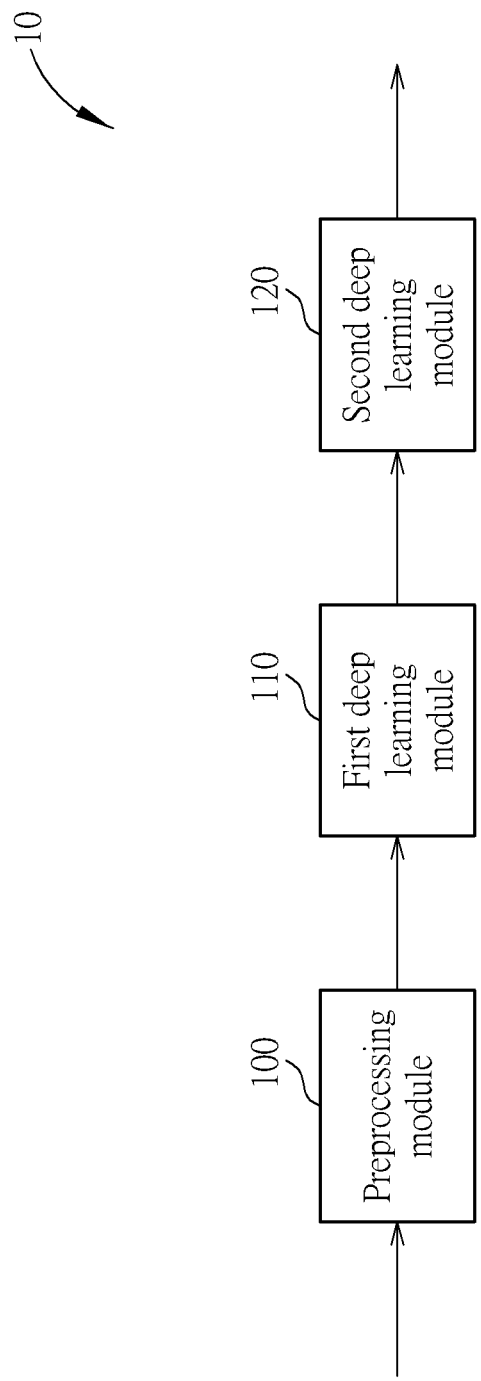
FIG. 1 is a schematic diagram of a computing device according to an example of the present invention.

FIG. 1 is a schematic diagram of a computing device 10 according to an example of the present invention. The computing device 10 includes a preprocessing module 100, a first deep learning module 110 and a second deep learning module 120. In detail, the preprocessing module 100 receives a first plurality of frames, and determines whether to delete at least one of the first plurality of frames according to an event detection. The preprocessing module 100 generates a second plurality of frames according to the determination for the first plurality of frames. That is, the preprocessing module 100 processes (e.g., checks) the first plurality of frames, to determine whether the first plurality of frames includes at least one event according to the event detection. If one of the first plurality of frames includes the at least one event, the preprocessing module 100 does not delete the one of the first plurality of frames, and generates one of the second plurality of frames according to the one of the first plurality of frames. If the one of the first plurality of frames does not include any event, the preprocessing module 100 deletes the one of the first plurality of frames, and does not generate the one of the second plurality of frames according to the one of the first plurality of frames. In other words, the second plurality of frames include event (s).

The first deep learning module 110 is coupled to the preprocessing module 100, and receives the second plurality of frames. The first deep learning module 110 determines whether to delete at least one of the second plurality of frames according to a first plurality of features of the second plurality of frames, and generates a third plurality of frames according to the determination for the second plurality of frames. That is, the first deep learning module 110 processes (e.g., checks) the second plurality of frames, to extract the first plurality of features of the second plurality of frames. The first deep learning module 110 determines whether the event(s) of the second plurality of frames belongs to a first target event according to the first plurality of features. If at least one event of one of the second plurality of frames belongs to the first target event, the first deep learning module 110 does not delete the one of the second plurality of frames, and generates one of the third plurality of frames. If the at least one event of the one of the second plurality of frames does not belong to the first target event, the first deep learning module 110 deletes the one of the second plurality of frames, and does not generate the one of the third plurality of frames. In other words, one of the third plurality of frames is one of the second plurality of frames including the at least one event, and the at least one event belongs to the first target event.

The second deep learning module 120 is coupled to the first deep learning module 110, and receives the third plurality of frames. The second deep learning module 120 generates a plurality of prediction outputs (e.g., prediction results) of the third plurality of frames. That is, the second deep learning module 120 processes the third plurality of frames, to extract a second plurality of features of the third plurality of frames. The second deep learning module 120 determines whether the event(s) of the third plurality of frames belongs to a second target event according to the second plurality of features, to generate the plurality of prediction outputs. If at least one event of one of the third plurality of frames belongs to the second target event, the second deep learning module 120 generates one of the plurality of prediction outputs indicating that the at least one event belongs to the second target event. If the at least one event of the one of the third plurality of frames does not belong to the second target event, the second deep learning module 120 generates one of the plurality of prediction outputs indicating that the at least one event does not belong to the second target event.

In one example, the first target event and the second target event may be different. For example, the first target event is a component captured perfectly, and the second target event is a normal condition of the component when the computing device 10 is for handling railroad component anomaly detection. In one example, the first target event and the second target event may be the same. For example, the first target event and the second target event are a same target person, when the computing device 10 is for handling person re-identification (person Re-ID). It should be noted that, computational complexity of the first deep learning module is smaller than computational complexity of the second deep learning module. Thus, even if the first target event and the second target event are the same, the determination of the second deep learning module may be more accurate than the determination of the first deep learning module.

In one example, the computing device 10 may further include an adaptive buffer. The adaptive buffer is coupled to the second deep learning module 120, and is for storing the plurality of prediction outputs. A size of the adaptive buffer is determined (e.g., changed) according to a number of at least one frame including an event, and the at least one frame is included in the first plurality of frames.

Figure 2:
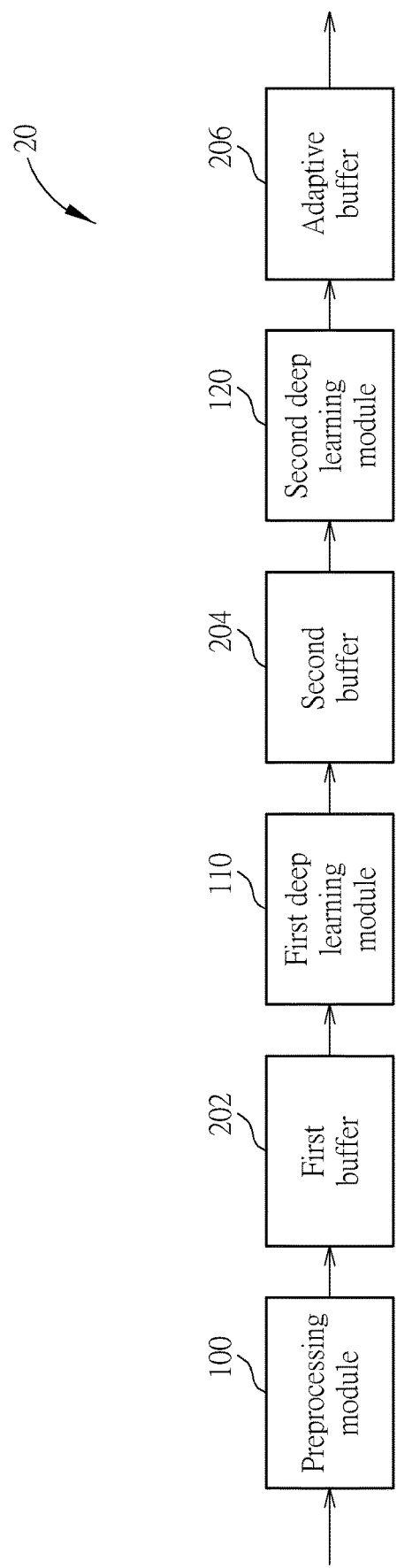
FIG. 2 is a schematic diagram of a computing device according to an example of the present invention.

FIG. 2 is a schematic diagram of a computing device 20 according to an example of the present invention. The computing device 20 includes the preprocessing module 100, the first deep learning module 110, the second deep learning module 120, a first buffer 202, a second buffer 204 and an adaptive buffer 206. The preprocessing module 100 generates the second plurality of frames, and transmits the second plurality of frames to the first buffer 202. The first buffer 202 is coupled to the preprocessing module 100 and the first deep learning module 110, and is for storing the second plurality of frames. The first deep learning module 110 receives the second plurality of frames from the first buffer 202. The first deep learning module 110 generates the third plurality of frames, and transmits the third plurality of frames to the second buffer 204. The second buffer 204 is coupled to the first deep learning module 110 and the second deep learning module 120, and is for storing the third plurality of frames. The second deep learning module 120 receives the third plurality of frames from the second buffer 204. The second deep learning module 120 generates the plurality of prediction outputs, and transmits the plurality of prediction outputs to the adaptive buffer 206. The adaptive buffer 206 is coupled to the second deep learning module 120, and is for storing the plurality of prediction outputs.

It should be noted that, successive frames in the first plurality of frames may include the same event according to a frame rate, but the second deep learning module 120 may generate different prediction outputs related to the same event (the prediction outputs related to the same event may be the same under an ideal situation). Thus, prediction outputs related to the same event may be averaged to prevent that a false operation (e.g., a false alarm) is performed according to a false prediction output generated by the second deep learning module 120.

In addition, a size of the adaptive buffer 206 may be determined (e.g., changed) according to a number of at least one frame including an event, wherein the at least one frame is included in the first plurality of frames. For example, the preprocessing module 100 evaluates the first plurality of frames, and calculates a relative speed of the event (i.e., the number of the at least one frame including the event). The preprocessing module 100 generates a result according to the relative speed (i.e., the number), and transmits the result to the adaptive buffer 206. The size of the adaptive buffer 206 is decreased, if a number of at least one first frame including a new event is less than a number of at least one second frame including a present event. The size of the adaptive buffer 206 is increased, if the number of the at least one first frame including the new event is more than the number of the at least one second frame including the present event. The at least one first frame and the at least one second frame are in the first plurality of frames.

In one example, the first buffer 202, the second buffer 204 and the adaptive buffer 206 may be file systems or memory systems.

In one example, when no event is detected, the preprocessing module 100 and the first deep learning module 110 may be paused, and the second deep learning module 120 may continue to process (e.g., receives) at least one of the thirds plurality of frames stored in the second buffer 204, to generate at least one of the plurality of prediction outputs.

In one example, timings at which the preprocessing module 100 performing the operations, the first deep learning module 110 performing the operations and the second deep learning module 120 performing the operations may be the same. That is, the preprocessing module 100, the first deep learning module 110 and the second deep learning module 120 may operate in parallel (i.e., at the same time).

In one example, the first plurality of frames may be generated (e.g., captured) by a video recorder (e.g., a camera). In one example, the first plurality of frames may be generated (e.g., captured) by different video recorders (e.g., different cameras).

In one example, the first plurality of frames are generated for a streaming or a video (e.g., a video clip). That is, the preprocessing module 100 may immediately receive and process the first plurality of frames, when a video recorder is running (e.g., working or capturing). In addition, the preprocessing module 100 may receive and process the first plurality of frames, after the video recorder stops running (e.g., working or capturing).

In one example, the first plurality of frames may be color images (e.g., RGB images). In one example, the first plurality of frames may be gray level images (e.g., gray scale images).

In one example, the event detection includes at least one of a motion detection and an object detection. In one example, the motion detection may include a scene subtraction. The preprocessing module 100 may use the scene subtraction to perform the motion detection, to determine whether to delete the at least one of the first plurality of frames. For example, the preprocessing module 100 subtracts one of the first plurality of frames from a neighboring frame of the one of the first plurality of frames, to generate a matrix with a size the same as that of the frames. The preprocessing module 100 sums all elements of the matrix, to generate a value. Then, the preprocessing module 100 determines not to delete the one of the first plurality of frames, if the value is larger than a threshold value. The preprocessing module 100 determines to delete the one of the first plurality of frames, if the value is smaller than a threshold value.

In one example, the object detection includes a feature extraction. The preprocessing module 100 may use the feature extraction to perform the object detection, to determine whether to delete the at least one of the first plurality of frames. The feature extraction may include at least one traditional computer vision method (e.g., low level computer vision method), such as edge detection (e.g., Hough transform). For example, the preprocessing module 100 does not delete the one of the first plurality of frames, if the preprocessing module 100 determines that one of the first plurality of frames includes at least one object according to the feature extraction. The preprocessing module 100 deletes the one of the first plurality of frames, if the preprocessing module 100 determines that one of the first plurality of frames does not include any object according to the feature extraction.

In one example, the preprocessing module 100 processes one of the first plurality of frames, if the one of the first plurality of frames is determined not to be deleted. That is, after the determination for the first plurality of frames is performed, the preprocessing module 100 processes the first plurality of frames which are not deleted, to generate the second plurality of frames. In one example, the operation of processing the one of the first plurality of frames includes at least one of a noise reduction, a downscaling operation, an adaptive histogram equalization, an image quality enhancement and a cropping operation.

In one example, a first time period between the preprocessing module 100 receiving the first plurality of frames and generating the second plurality of frames is smaller than a second time period between the first deep learning module 110 receiving the second plurality of frames and generating the third plurality of frames. In one example, a second time period between the first deep learning module 110 receiving the second plurality of frames and generating the third plurality of frames is smaller than a third time period between the second deep learning module 120 receiving the third plurality of frames and generating the plurality of prediction outputs. That is, an operating speed of the preprocessing module 100 is fastest, and an operating speed of the first deep learning module 110 is faster than an operating speed of the second deep learning module 120. Thus, the first deep learning module 110 and the second deep learning module 120 may not be idle to wait for inputs (i.e., the second plurality of frames and the third plurality of frames) generated by the previous module (i.e., the preprocessing module 100 and the first deep learning module 110).

In one example, a first time period between the preprocessing module 100 receiving the first plurality of frames and generating the second plurality of frames is equal to or smaller than a fourth time period between successive frames of the first plurality of frames (i.e., a captured time period between two successive frames of the first plurality of frames). In one example, a second time period between the first deep learning module 110 receiving the second plurality of frames and generating the third plurality of frames is equal to or smaller than a fourth time period between successive frames of the first plurality of frames (i.e., a captured time period between two successive frames of the first plurality of frames). That is, operating speeds of the preprocessing module 100 and the first deep learning module 110 are equal to or faster than a frame rate, and operations of the preprocessing module 100 and the first deep learning module 110 are real-time.

In one example, a third time period between the second deep learning module 120 receiving the third plurality of frames and generating the plurality of prediction outputs may be equal to or smaller than a fourth time period between successive frames of the first plurality of frames (i.e., a captured time period between two successive frames of the first plurality of frames). In one example, a third time period between the second deep learning module 120 receiving the third plurality of frames and generating the plurality of prediction outputs may be larger than a fourth time period between successive frames of the first plurality of frames (i.e., a captured time period between two successive frames of the first plurality of frames). That is, operating speed of the second deep learning module 120 may or may not faster than a frame rate, and operations of the second deep learning module 120 may or may not be real-time.

In one example, computational complexity of the preprocessing module 100 is smaller than computational complexity of the second deep learning module 120. In one example, computational complexity of first deep learning module 110 is smaller than computational complexity of the second deep learning module 120. In one example, the preprocessing module 100 and the first deep learning module 110 are for determining whether to delete the received frames (i.e., the at least one of the first plurality of frames and the at least one of the second plurality of frames) according to different methods. That is, although the computational complexity of the second deep learning module 120 is larger than the computational complexity of the preprocessing module 100 and the first deep learning module 110, a number of frames (e.g., a number of the third plurality of frames) processed (e.g., received) by the second deep learning module 120 is less than numbers of the first plurality of frames and the second plurality of frames. Thus, computational complexity of hardware is reduced.

In one example, a number of the first plurality of frames received by the preprocessing module 100 is more than a number of the second plurality of frames received by the first deep learning module 110. In one example, the number of the second plurality of frames received by the first deep learning module 110 is more than a number of the third plurality of frames received by the second deep learning module 120.

In one example, the first deep learning module 110 and the second deep learning module 120 are convolutional neural networks (CNNs). In one example, the CNNs include at least one of a convolution layer, a max pooling layer, an activation function layer and a fully connected layer. In one example, the CNNs may further include at least one identity mapping (e.g., identity mapping shortcut).

In one example, loss functions (e.g., objective functions) of the first deep learning module 110 and the second deep learning module 120 may be the same or different. In one example, the loss function may be a cross-entropy loss function. In one example, sizes of kernel maps of different convolution layers may be different. In one example, dropout may be used for reducing effects caused by overfitting, when the first deep learning module 110 and/or the second deep learning module 120 are trained. In one example, batch normalization may be used after every layer of the first deep learning module 110 and the second deep learning module 120.

In one example, an Adaptive Moment Estimation (ADAM) optimizer is used for updating parameters of the first deep learning module 110 and the second deep learning module 120, when the first deep learning module 110 and the second deep learning module 120 are trained.

In one example, the plurality of prediction outputs are one-hot vectors. In one example, the plurality of prediction outputs are for indicating whether an event of the third plurality of frames is an anomaly. In one example, the plurality of prediction outputs are for tracking an event of the third plurality of frames. In one example, the plurality of prediction outputs are for counting a number of an event of the third plurality of frames.

In one example, the event of the above examples may be a target (e.g., an object, a railroad component, a person or a vehicle), a car accident or a traffic jam.

According to the present invention, the computing device 10 and/or 20 may be applied to different applications to solve different problems. The following examples are used for illustrating operation schemes of the computing device 10 and 20.

Figure 3:
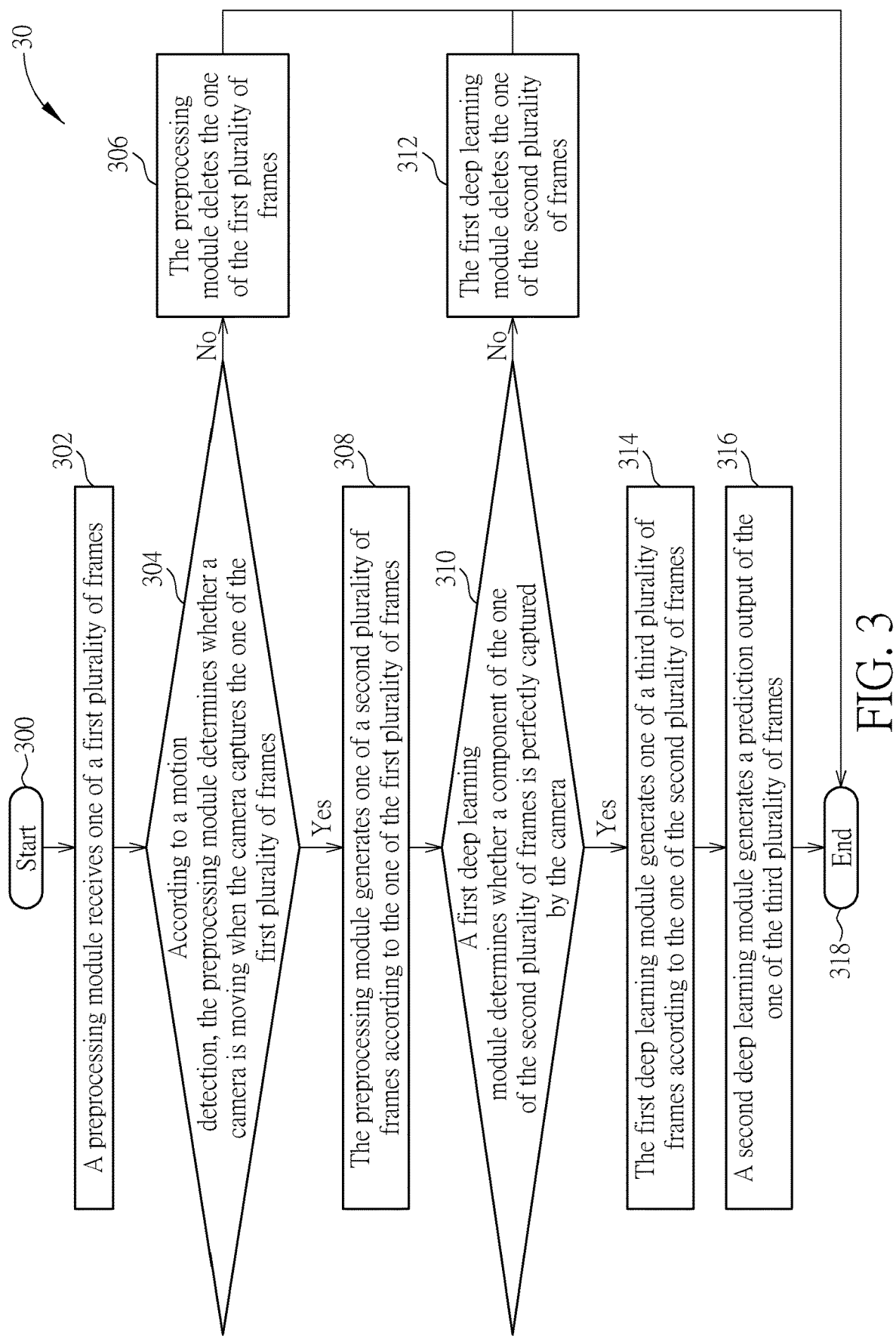
FIG. 3 is a flowchart of a process for railroad component anomaly detection according to an example of the present invention.

FIG. 3 is a flowchart of a process 30 for railroad component anomaly detection according to an example of the present invention. The process 30 is utilized in the computing device 10 and/or 20 for handling the railroad component anomaly detection, and includes the following steps:

Step 300: Start.

Step 302: A preprocessing module (e.g., the preprocessing module 100) receives one of a first plurality of frames.

Step 304: According to a motion detection, the preprocessing module determines whether a camera is moving when the camera captures the one of the first plurality of frames. If no, perform Step 306; otherwise, go to Step 308.

Step 306: The preprocessing module deletes the one of the first plurality of frames.

Step 308: The preprocessing module generates one of a second plurality of frames according to the one of the first plurality of frames.

Step 310: A first deep learning module (e.g., the first deep learning module 110) determines whether a component of the one of the second plurality of frames is perfectly captured by the camera. If no, perform Step 312; otherwise, go to Step 314.

Step 312: The first deep learning module deletes the one of the second plurality of frames.

Step 314: The first deep learning module generates one of a third plurality of frames according to the one of the second plurality of frames.

Step 316: A second deep learning module (e.g., the second deep learning module 120) generates a prediction output of the one of the third plurality of frames.

Step 318: End.

According to the process 30, a preprocessing module receives one of a first plurality of frames, and determines whether a camera is moving when the camera captures the one of the first plurality of frames according to a motion detection. If the camera is determined to be not moving when the camera captures the one of the first plurality of frames, the preprocessing module deletes the one of the first plurality of frames. Otherwise, the preprocessing module generates one of a second plurality of frames according to the one of the first plurality of frames. A first deep learning module receives the one of the second plurality of frames, and determines whether a component (e.g., a target component) of the one of the second plurality of frames is perfectly captured by the camera (e.g., the component is complete in the one of the second plurality of frames). If the component is determined to be not captured perfectly, the first deep learning module deletes the one of the second plurality of frames. Otherwise, the first deep learning module generates one of a third plurality of frames according to the one of the second plurality of frames. A second deep learning module receives the one of the third plurality of frames, and generates a prediction output of the one of the third plurality of frames (e.g., according to a condition of the component). That is, the first plurality of frames are processed according to the process 30, when the computing device 10 and/or 20 is for handling the railroad component anomaly detection.

In one example, the operation that the first deep learning module generates the one of the third plurality of frames may be replaced by an operation that the first deep learning module transmits the one of the second plurality of frames to the second deep learning module. That is, the one of the third plurality of frames is the one of the second plurality of frames, if the component of the one of the second plurality of frames is determined to be captured perfectly.

In one example, the first plurality of frames are generated (e.g., captured) by a camera. In one example, the camera with a light source may be set at a bottom of a train or an inspection device on a track (e.g., a railroad). The train or the inspection device may have different speeds on different paths. The paths may be straight or curved. In one example, the component may be a fastener, a bolt, etc., installed at the track.

In one example, the motion detection includes a scene subtraction. The preprocessing module uses the scene subtraction to perform the motion detection, to determine whether a camera is moving, when the camera captures the one of the first plurality of frames. For example, the preprocessing module subtracts the one of the first plurality of frames from a neighboring frame of the one of the first plurality of frames, to generate a matrix with a size the same as that of the frames. The preprocessing module sums all elements of the matrix, to generate a value. Then, the preprocessing module determines that the camera is moving when the camera captures the one of the first plurality of frames, if the value is larger than a threshold value. The preprocessing module 100 determines that the camera is not moving when the camera captures the one of the first plurality of frames, and deletes the one of the first plurality of frames, if the value is smaller than the threshold value.

In one example, the preprocessing module may perform the following steps to generate the one of the second plurality of frames: cropping the one of the first plurality of frames according to a track locating operation; processing the one of the first plurality of frames; and generating the one of the second plurality of frames according to the cropping operation and the processing operation.

Figure 4:
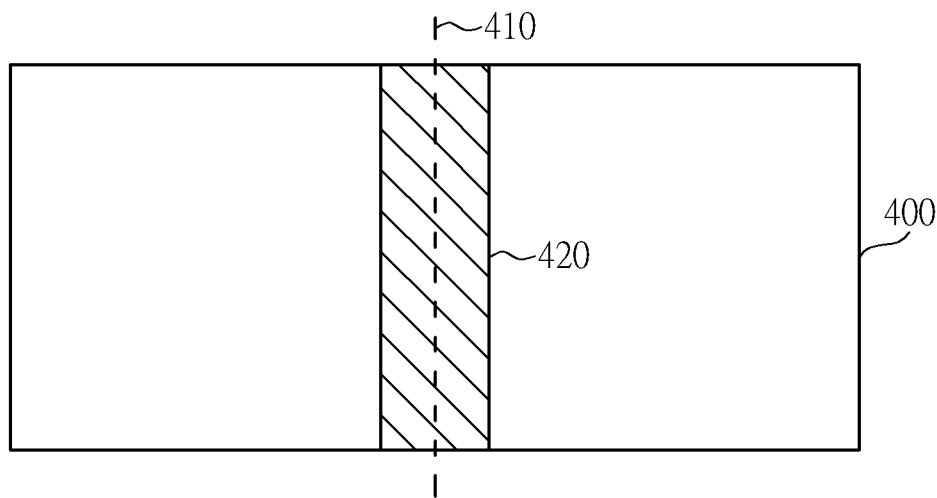
FIG. 4 is a schematic diagram of a frame according to an example of the present invention.
Figure 4:
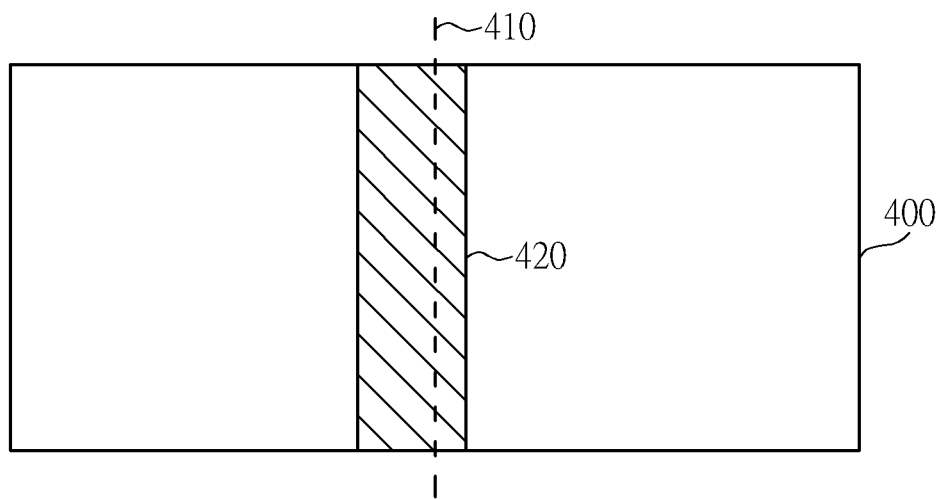
Figure 4:
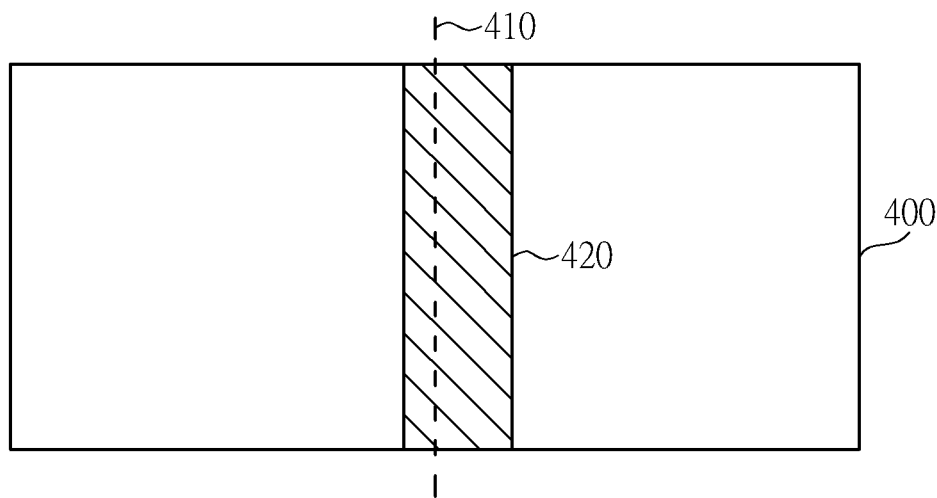

FIG. 4 is a schematic diagram of a frame 400 according to an example of the present invention. Three cases (a)-(c) with a center line 410 are used for illustrating possible scenarios of the present invention, but are not limited herein. The frame 400 may be utilized for realizing the first plurality of frames received by the preprocessing module in FIG. 3. The frame 400 includes a track 420, and the track 420 may be a portion of a track with different curves in the three cases. The center line 410 is at the middle of the frame 400.

In the case (a), comparing the center line 410 with a position of the track 420, the track 420 is at the middle of the frame 400. In the case (b), comparing the center line 410 with a position of the track 420, pixels of the track 420 in a left side of the frame 400 are more than pixels of the track 420 in a right side of the frame 400. In the case (c), comparing the center line 410 with a position of the track 420, pixels of the track 420 in a right side of the frame 400 are more than pixels of the track 420 in a left side of the frame 400. That is, a track may not be at the middle of each of the first plurality of frames, because of shaking of the train, the different speeds of the train and the different curves of the track. Thus, the preprocessing module needs the track locating operation to track a shift of the track, to find a cropping coordinate.

In one example, the track locating operation may include binarization, centroid calculation and moving average. In detail, the preprocessing module binarizes the one of the first plurality of frames by using a threshold value according to a contrast (since the track is brighter than other components), and calculates a centroid coordinate of the one of the first plurality of frames. Then, the preprocessing module uses the moving average to smooth the centroid coordinate with centroid coordinates of the first plurality of frames which are calculated before. The moving average is used for ensuring that the centroid coordinate is correct, and is not affected by uncertain factors (e.g., a partly rusty track).

In one example, the operation of the preprocessing module processing the one of the first plurality of frames may include at least one of a noise reduction, a downscaling operation, an adaptive histogram equalization. In one example, the noise reduction may be a Gaussian smoothing operation. In one example, the preprocessing module downscales the one of the first plurality of frames, to reduce computational complexity.

In one example, the first deep learning module processes (e.g., checks) the one of the second plurality of frames, to extract at least one first feature of the one of the second plurality of frames. The first deep learning module determines whether the component of the one of the second plurality of frames is perfectly captured by the camera according to the at least one first feature.

In one example, the second deep learning module processes (e.g., checks) the one of the third plurality of frames, to extract at least one second feature of the one of the third plurality of frames. The second deep learning module determines whether the component is an anomaly according to the at least one second feature, wherein the at least one second feature represents a condition of the component of the one of the third plurality of frames). The second deep learning module generates the prediction output according to the determination, wherein the prediction output indicates whether the component is an anomaly. For example, the second deep learning module may determine whether a fastener is an anomaly according to an angle between a marking line on a bolt of the fastener and the track is larger than N degrees.

Figure 5:
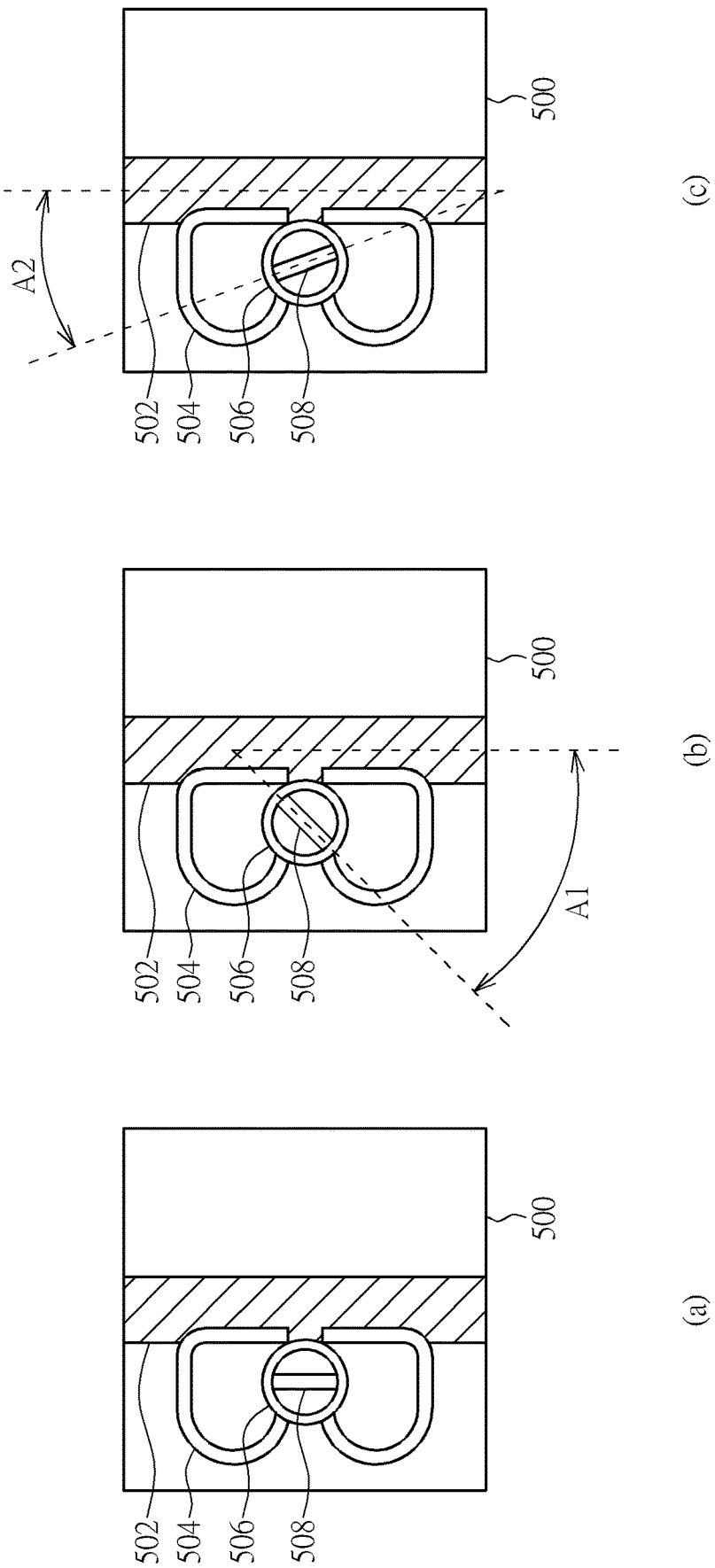
FIG. 5 is a schematic diagram of a frame according to an example of the present invention.

FIG. 5 is a schematic diagram of a frame 500 according to an example of the present invention. The frame 500 may be utilized for realizing the third plurality of frames received by the second deep learning module in FIG. 3. The frame 500 includes a track 502, a fastener 504, a bolt 506 and a marking line 508. The bolt 506 is for fastening the fastener 504 with the track 502. The marking line 508 locates on the bolt 506. Although different track systems may be operated for different applications, each of the components in FIG. 5 may be used for any basic track system with different materials or different shapes. Three cases (a)-(c) are used for illustrating possible scenarios of the present invention, but are not limited herein.

In the case (a), an angle between the marking line 508 and the track 502 is 0 degrees, and can be seen as an ideal angle. Thus, the second deep learning module may determine that the fastener 504 of the frame 500 is normal according to the angle. In the case (b), there is an angle A1 between the marking line 508 and the track 502. The second deep learning module determines whether the fastener 504 of the frame 500 is an anomaly according to the angle A1. For example, if the angle A1 is larger than N degrees, the second deep learning module may determine that the fastener 504 is an anomaly, and generates a prediction output indicating the fastener 504 of the frame 500 is the anomaly. If the angle A1 is smaller than the N degrees, the second deep learning module may determine that the fastener 504 is normal, and generates a prediction output indicating the fastener 504 of the frame 500 is normal. In the case (c), there is an angle A2 between the marking line 508 and the track 502. The second deep learning module determines whether the fastener 504 of the frame 500 is an anomaly according to the angle A2. For example, if the angle A2 is larger than N degrees, the second deep learning module may determine that the fastener 504 is an anomaly, and generates a prediction output indicating the fastener 504 of the frame 500 is an anomaly. If the angle A2 is smaller than the N degrees, the second deep learning module may determine that the fastener 504 is normal, and generates a prediction output indicating the fastener 504 of the frame 500 is normal.

In one example, contents of training databases of the first deep learning module and the second deep learning module are divided into normal data and abnormal data, when the first deep learning module and/or the second deep learning module are trained. For example, for the first deep learning module, the normal data are images including a complete fastener, and the abnormal data are images including an incomplete fastener or without any fastener. For the second deep learning module, the normal data are images including the complete fastener, wherein an angle between a marking line on a bolt of the fastener and the track is small than N degrees. The abnormal data are images including the complete fastener, wherein an angle between the marking line on the bolt of the fastener and the track is larger than N degrees. That is, the training databases are not shared between the first deep learning module and the second deep learning module, and labeling operations of the first deep learning module and the second deep learning module are different.

In one example, the prediction output is a one-hot vector. For example, the prediction output may be a vector [0 1] or a vector [1 0]. The vector [0 1] means that the second deep learning module determines that the component is an anomaly, and the vector [1 0] means that the second deep learning module determines that the component is normal.

In one example, after the second deep learning module generates the prediction output indicating that the component is an anomaly, other device(s) may perform corresponding operation(s) (e.g., repairing the component) according to the prediction output and a location of the component.

In one example, the first deep learning module and the second deep learning module are CNNs. In one example, the CNNs include at least one of a convolution layer, a max pooling layer, an activation function layer and a fully connected layer, wherein the activation function layer is a Leaky Rectified Linear Unit (ReLU) function layer. In one example, sizes of kernel maps of different convolution layers may be different. In one example, loss functions of the first deep learning module and the second deep learning module are cross-entropy loss functions. In one example, the CNNs may further include at least one identity mapping (e.g., identity mapping shortcut).

Figure 6:
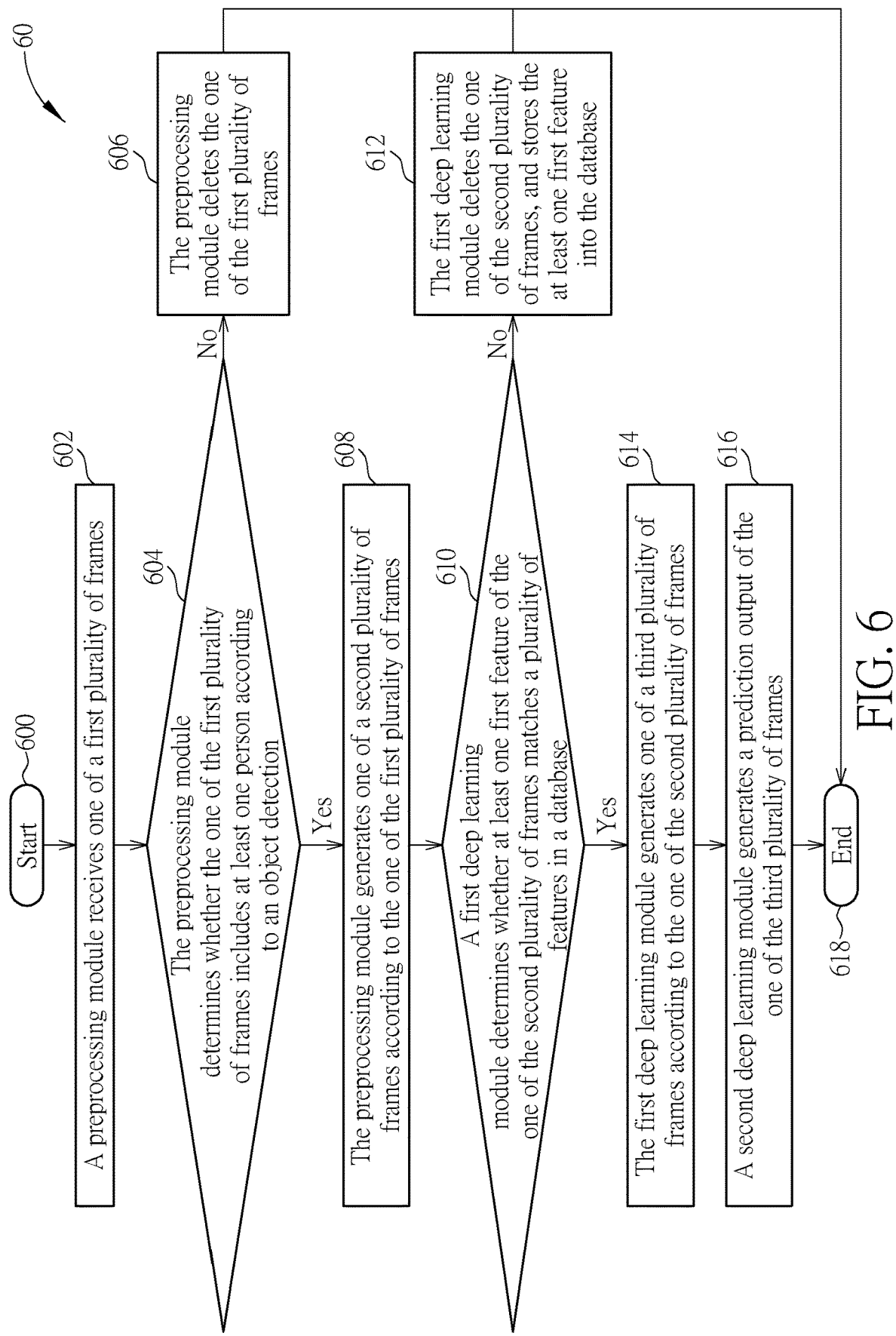
FIG. 6 is a flowchart of a process for person re-identification according to an example of the present invention.

FIG. 6 is a flowchart of a process 60 for person re-identification (person Re-ID) according to an example of the present invention. The process 60 may be utilized in the computing device 10 and/or 20 for handling the person Re-ID, and includes the following steps:

Step 600: Start.

Step 602: A preprocessing module (e.g., the preprocessing module 100) receives one of a first plurality of frames.

Step 604: The preprocessing module determines whether the one of the first plurality of frames includes at least one person according to an object detection. If no, perform Step 606; otherwise, go to Step 608.

Step 606: The preprocessing module deletes the one of the first plurality of frames.

Step 608: The preprocessing module generates one of a second plurality of frames according to the one of the first plurality of frames.

Step 610: A first deep learning module (e.g., the first deep learning module 110) determines whether at least one first feature of the one of the second plurality of frames matches a plurality of features in a database. If no, perform Step 612; otherwise, go to Step 614.

Step 612: The first deep learning module deletes the one of the second plurality of frames, and stores the at least one first feature into the database.

Step 614: The first deep learning module generates one of a third plurality of frames according to the one of the second plurality of frames.

Step 616: A second deep learning module (e.g., the second deep learning module 120) generates a prediction output of the one of the third plurality of frames.

Step 618: End.

According to the process 60, a preprocessing module receives one of a first plurality of frames, and determines whether the one of the first plurality of frames includes at least one person according to an object detection (e.g., a human detection). If the one of the first plurality of frames is determined to not include any person, the preprocessing module deletes the one of the first plurality of frames. Otherwise, the preprocessing module generates one of a second plurality of frames according to the one of the first plurality of frames. A first deep learning module receives the one of the second plurality of frames, and determines whether at least one first feature of the one of the second plurality of frames (e.g., at least one first feature of the at least one person) matches a plurality of features in a database. If the at least one first feature is determined to not match the plurality of features in the database, the first deep learning module deletes the one of the second plurality of frames, and stores the at least one first feature into the database. Otherwise, the first deep learning module generates one of a third plurality of frames according to the one of the second plurality of frames. A second deep learning module receives the one of the third plurality of frames, and generates a prediction output of the one of the third plurality of frames. The prediction output indicates whether the at least one person is a person in the database. That is, the first plurality of frames are processed according to the process 60, when the computing device 10 and/or 20 is for handling the person Re-ID.

In one example, the operation that the first deep learning module generates the one of the third plurality of frames may be replaced by an operation that the first deep learning module transmits the one of the second plurality of frames to the second deep learning module. That is, the one of the third plurality of frames is the one of the second plurality of frames, if the first deep learning module determines that the at least one first feature matches the plurality of features in the database.

In one example, the first plurality of frames may be generated (e.g., captured) by different video recorders (e.g., different cameras).

In one example, the object detection includes a feature extraction. The preprocessing module may use the feature extraction to perform the object detection, to determine whether the one of the first plurality of frames includes at least one person. The feature extraction includes at least one traditional computer vision method (e.g., low level computer vision method), such as an edge detection (e.g., Hough transform).

In one example, the preprocessing module may determine whether to delete the one of the first plurality of frames according to a motion detection, before the object detection is performed. The motion detection includes a scene subtraction. The preprocessing module may use the scene subtraction to perform the motion detection, to determine whether the one of the first plurality of frames is the same as a neighboring frame of the one of the first plurality of frames. That is, the preprocessing module may perform the object detection and the motion detection, to determine whether to delete the one of the first plurality of frames.

In one example, the preprocessing module may perform the following steps to generate the one of the second plurality of frames: cropping the one of the first plurality of frames according to an object locating operation; processing the one of the first plurality of frames; and generating the one of the second plurality of frames according to the cropping operation and the processing operation.

In one example, the object locating operation may include a feature extraction. The preprocessing module uses the feature extraction to locate at least one location of the at least one person, to crop at least one bounding box of the at least one person. The feature extraction includes at least one traditional computer vision method (e.g., low level computer vision method), such as an edge detection (e.g., Hough transform).

In one example, the operation of the preprocessing module processing the one of the first plurality of frames may include at least one of a noise reduction, a downscaling operation, an image quality enhancement (e.g., a contrast enhancement of color). In one example, the noise reduction may be a Gaussian smoothing operation. In one example, the preprocessing module downscales the one of the first plurality of frames, to reduce computational complexity.

In one example, the database includes a plurality of features of a plurality of people. In one example, the first deep learning module processes (e.g., checks) the one of the second plurality of frames, to extract at least one first feature of the one of the second plurality of frames. The first deep learning module determines whether the at least one first feature matches the plurality of features in the database.

In one example, the second deep learning module processes (e.g., checks) the one of the third plurality of frames, to extract at least one second feature of the one of the third plurality of frames (e.g., at least one second feature of the at least one person). The second deep learning module determines whether the at least one second feature matches the plurality of features in the database, to generate a prediction output. The prediction output indicates whether the at least one person is a person in the database. It should be noted that, computational complexity of the first deep learning module is smaller than computational complexity of the second deep learning module. Thus, the at least one second feature extracted by the second deep learning module may be different from the at least one first feature extracted by the first deep learning module. The determination of the second deep learning module may be more accurate than the determination of the first deep learning module.

In one example, the one of the third plurality of frames is labeled to be stored in the database, if the prediction output indicating that the at least one person is a person in the database is generated. Parameters of the first deep learning module and the second deep learning module are trained according to a new database (e.g., including the one of the third plurality of frames). That is, the plurality of features in the database is refined according to the at least one second feature, if the second deep learning module determines that the at least one second feature matches the plurality of features. Thus, the first deep learning module and the second deep learning module may be more robust according to the present invention.

In one example, the prediction output is a one-hot vector.

In one example, after the second deep learning module generates a prediction output indicating that the at least one person is a person in the database, other device (s) (or other module (s) of the computing device 10 and/or 20) may track a trajectory of the at least one person according to the prediction output and a location of the video recorder.

In one example, the first deep learning module and the second deep learning module are CNNs. In one example, the CNNs include at least one of a convolution layer, a max pooling layer, an activation function layer and a fully connected layer. In one example, the CNNs may further include at least one identity mapping (e.g., identity mapping shortcut). In one example, sizes of kernel maps of different convolution layers may be the same or different. In one example, loss functions of the first deep learning module and the second deep learning module may be the same or different.

Figure 7:
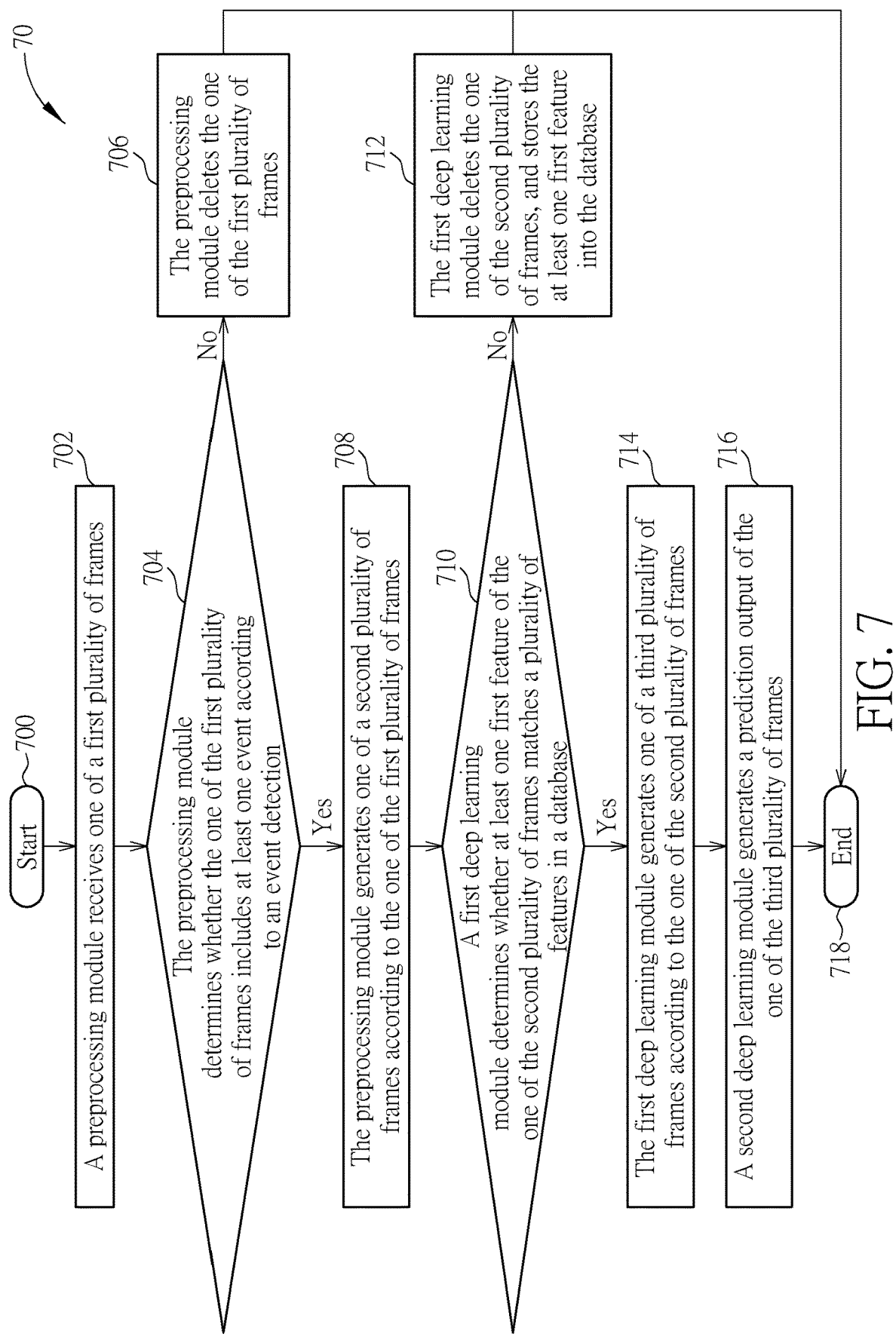
FIG. 7 is a flowchart of a process for traffic monitoring according to an example of the present invention.

FIG. 7 is a flowchart of a process 70 for traffic monitoring according to an example of the present invention. The process 70 is utilized in the computing device 10 and/or 20 for handling the traffic monitoring, and includes the following steps:

Step 700: Start.

Step 702: A preprocessing module (e.g., the preprocessing module 100) receives one of a first plurality of frames.

Step 704: The preprocessing module determines whether the one of the first plurality of frames includes at least one event according to an event detection. If no, perform Step 706; otherwise, go to Step 708.

Step 706: The preprocessing module deletes the one of the first plurality of frames.

Step 708: The preprocessing module generates one of a second plurality of frames according to the one of the first plurality of frames.

Step 710: A first deep learning module (e.g., the first deep learning module 110) determines whether at least one first feature of the one of the second plurality of frames matches a plurality of features in a database. If no, perform Step 712; otherwise, go to Step 714.

Step 712: The first deep learning module deletes the one of the second plurality of frames, and stores the at least one first feature into the database.

Step 714: The first deep learning module generates one of a third plurality of frames according to the one of the second plurality of frames.

Step 716: A second deep learning module (e.g., the second deep learning module 120) generates a prediction output of the one of the third plurality of frames.

Step 718: End.

According to the process 70, a preprocessing module receives one of a plurality of frames, and determines whether the one of the first plurality of frames includes at least one event according to an event detection. If the one of the first plurality of frames is determined to not include any event, the preprocessing module deletes the one of the first plurality of frames. Otherwise, the preprocessing module generates one of a second plurality of frames according to the one of the first plurality of frames. A first deep learning module receives the one of the second plurality of frames, and determines whether at least one first feature of the one of the second plurality of frames (e.g., at least one first feature of the at least one event) matches a plurality of features in a database. If the at least one first feature is determined to not match the plurality of features in the database, the first deep learning module deletes the one of the second plurality of frames, and stores the at least one first features into the database. Otherwise, the first deep learning module generates one of a third plurality of frames according to the one of the second plurality of frames. A second deep learning module receives the one of the third plurality of frames, and generates a prediction output of the one of the third plurality of frames. The prediction output indicates whether the at least one event is a target event in the database. That is, the first plurality of frames are processed according to the process 70, when the computing device 10 and/or 20 is for handling the traffic monitoring.

In one example, the operation that the first deep learning module generates the one of the third plurality of frames may be replaced by an operation that the first deep learning module transmits the one of the second plurality of frames to the second deep learning module. That is, the one of the third plurality of frames is the one of the second plurality of frames, if the first deep learning module determines that the at least one first feature matches the plurality of features in the database.

In one example, the first plurality of frames may be generated (e.g., captured) by a video recorders (e.g., a camera). In one example, the first plurality of frames may be generated (e.g., captured) by different video recorders (e.g., different cameras).

In one example, the event detection may include an object detection and a motion detection, to determine whether the one of the first plurality of frames includes the at least one event.

In one example, the object detection includes a feature extraction. The preprocessing module may use the feature extraction to perform the object detection, to determine whether the one of the first plurality of frames includes the at least one event. The feature extraction may include at least one traditional computer vision method (e.g., low level computer vision method), such as edge detection (e.g., Hough transform). In one example, the motion detection includes a scene subtraction. The preprocessing module may use the scene subtraction to perform the motion detection. That is, the preprocessing module may perform the object detection and the motion detection, to determine whether to delete the one of the first plurality of frames.

In one example, the preprocessing module may perform the following steps to generate the one of the second plurality of frames: cropping the one of the first plurality of frames according to an object locating operation; processing the one of the first plurality of frames; and generating the one of the second plurality of frames according to the cropping operation and the processing operation.

In one example, the object locating operation includes a feature extraction. The preprocessing module may use the feature extraction to locate at least one location of the at least one event, to crop at least one bounding box of the at least one event. The feature extraction includes at least one traditional computer vision method (e.g., low level computer vision method), such as edge detection (e.g., Hough transform).

In one example, the operation of the preprocessing module processing the one of the first plurality of frames may include at least one of a noise reduction, a downscaling operation, an image quality enhancement (e.g., a contrast enhancement of color). In one example, the noise reduction may be a Gaussian smoothing operation. In one example, the preprocessing module downscales the one of the first plurality of frames, to reduce computational complexity.

In one example, the database includes a plurality of features of a plurality of events. In one example, the first deep learning module processes (e.g., checks) the one of the second plurality of frames, to extract at least one first feature of the one of the second plurality of frames. The first deep learning module determines whether the at least one first feature matches the plurality of features in the database.

In one example, the second deep learning module processes (e.g., checks) the one of the third plurality of frames, to extract at least one second feature of the one of the third plurality of frames (e.g., at least one second feature of the at least one event). The second deep learning module determines whether the at least one second feature matches the plurality of features in the database, to generate a prediction output. The prediction output indicates whether the at least one event is a target event in the database. It should be noted that, computational complexity of the first deep learning module is smaller than computational complexity of the second deep learning module. Thus, the at least one second feature extracted by the second deep learning module may be different from the at least one first feature extracted by the first deep learning module. The determination of the second deep learning module may be more accurate than the determination of the first deep learning module.

In one example, the one of the third plurality of frames is labeled to be stored in the database, if the prediction output indicating that the at least one event is the target event in the database is generated. Parameters of the first deep learning module and the second deep learning module are trained according to a new database (e.g., including the one of the third plurality of frames). That is, the plurality of features in the database is refined according to the at least one second feature, if the second deep learning module determines that the at least one second feature matches the plurality of features. Thus, the first deep learning module and the second deep learning module may be more robust according to the present invention.

In one example, the at least one event may be one of vehicles, people, a car accident and a traffic jam. In one example, the prediction output is a one-hot vector.

In one example, after the second deep learning module generates a prediction output indicating that the at least one event is the target event in the database, other device(s) (or other module(s) of the computing device 10 and/or 20) may perform operation (s) related to the traffic monitoring according to the prediction output and a location of the video recorder. The operation(s) related to the traffic monitoring may be counting a number of vehicles, searching a specific vehicle, improving (e.g., rescheduling) a traffic plan or reporting a car accident.

In one example, the first deep learning module and the second deep learning module are CNNs. In one example, the CNNs include at least one of a convolution layer, a max pooling layer, an activation function layer and a fully connected layer. In one example, the CNNs may further include at least one identity mapping (e.g., identity mapping shortcut). In one example, sizes of kernel maps of different convolution layers may be the same or different. In one example, loss functions of the first deep learning module and the second deep learning module may be the same or different.

Figure 8:
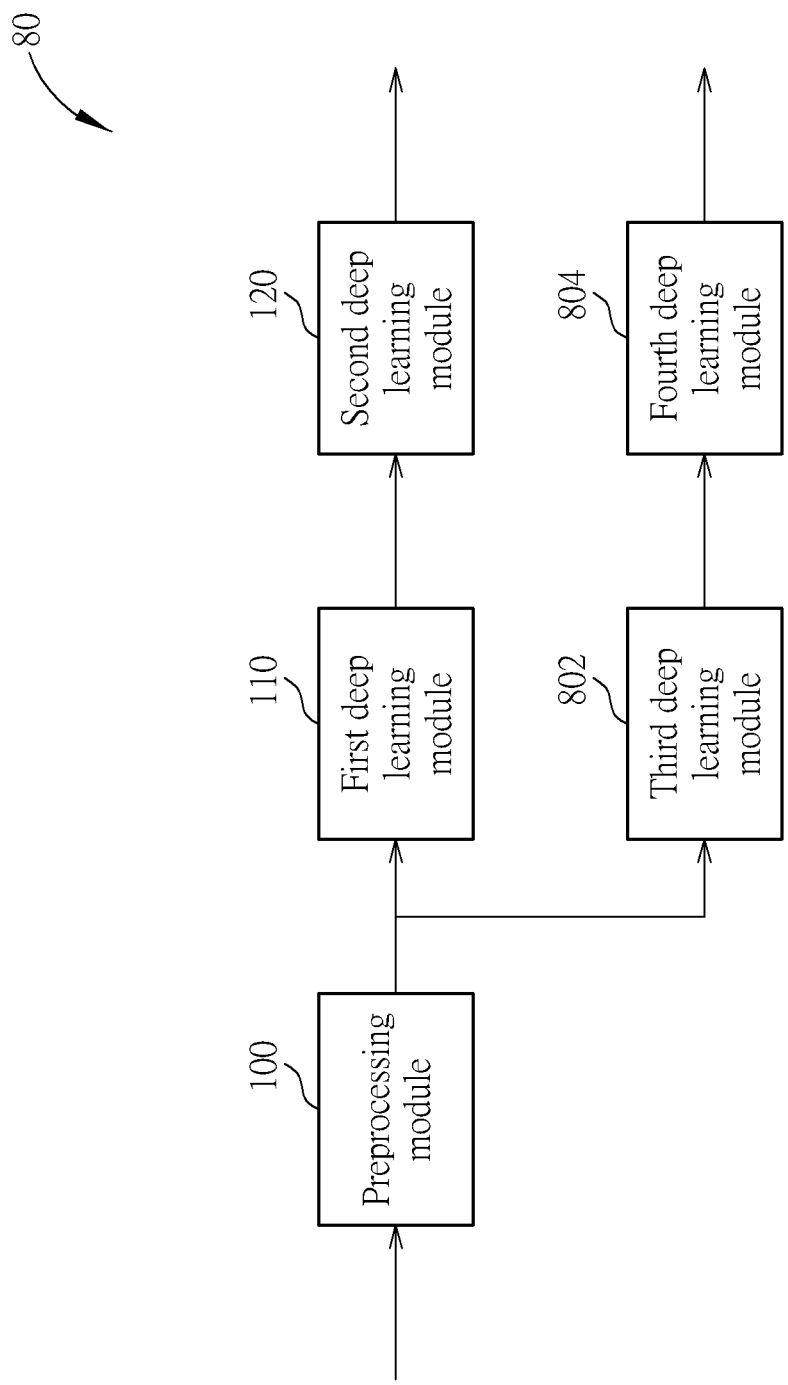
FIG. 8 is a schematic diagram of a computing device according to an example of the present invention.

FIG. 8 is a schematic diagram of a computing device 80 according to an example of the present invention. The computing device 80 includes the preprocessing module 100, the first deep learning module 110, the second deep learning module 120, a third deep learning module 802 and a fourth deep learning module 804. In detail, the third deep learning module 802 is coupled to the preprocessing module 100, and receives the second plurality of frames from the preprocessing module 100. The third deep learning module 802 determines whether to delete at least one of the second plurality of frames, and generates a fourth plurality of frames according to the determination for the second plurality of frames. The fourth deep learning module 804 is coupled to the third deep learning module 802, and receives the fourth plurality of frames from the third deep learning module 802. The fourth deep learning module 804 generates a new plurality of prediction outputs of the fourth plurality of frames. The examples described above for the first deep learning module 110, the second deep learning module 120 may be applied to the third deep learning module 802 and the fourth deep learning module 804, respectively, and are not narrated herein. Thus, a combination of the third deep learning module 802 and the fourth deep learning module 804 and a combination of the first deep learning module 110 and the second deep learning module 120 receive the same frames (e.g., the second plurality of frames), to generate different prediction outputs for different applications.

In one example, the plurality of prediction outputs and the new plurality of prediction outputs are applied to different applications to solve different problems. For example, when the computing device 80 is for the traffic monitoring, the plurality of prediction outputs and the new plurality of prediction outputs may be applied to count a number of vehicles and to search a specific vehicle, respectively.

In one example, the computing device 80 may further include buffers between the modules, wherein the buffers may be file systems or memory systems.

In one example, the computing device 80 may further include M combinations of two deep learning modules, wherein the M combinations are coupled to the same preprocessing module (e.g., the preprocessing module 100), and are coupled in parallel. That is, different combinations receive the same frames (e.g., the second plurality of frames), to generate different prediction outputs for different applications.

Figure 9:
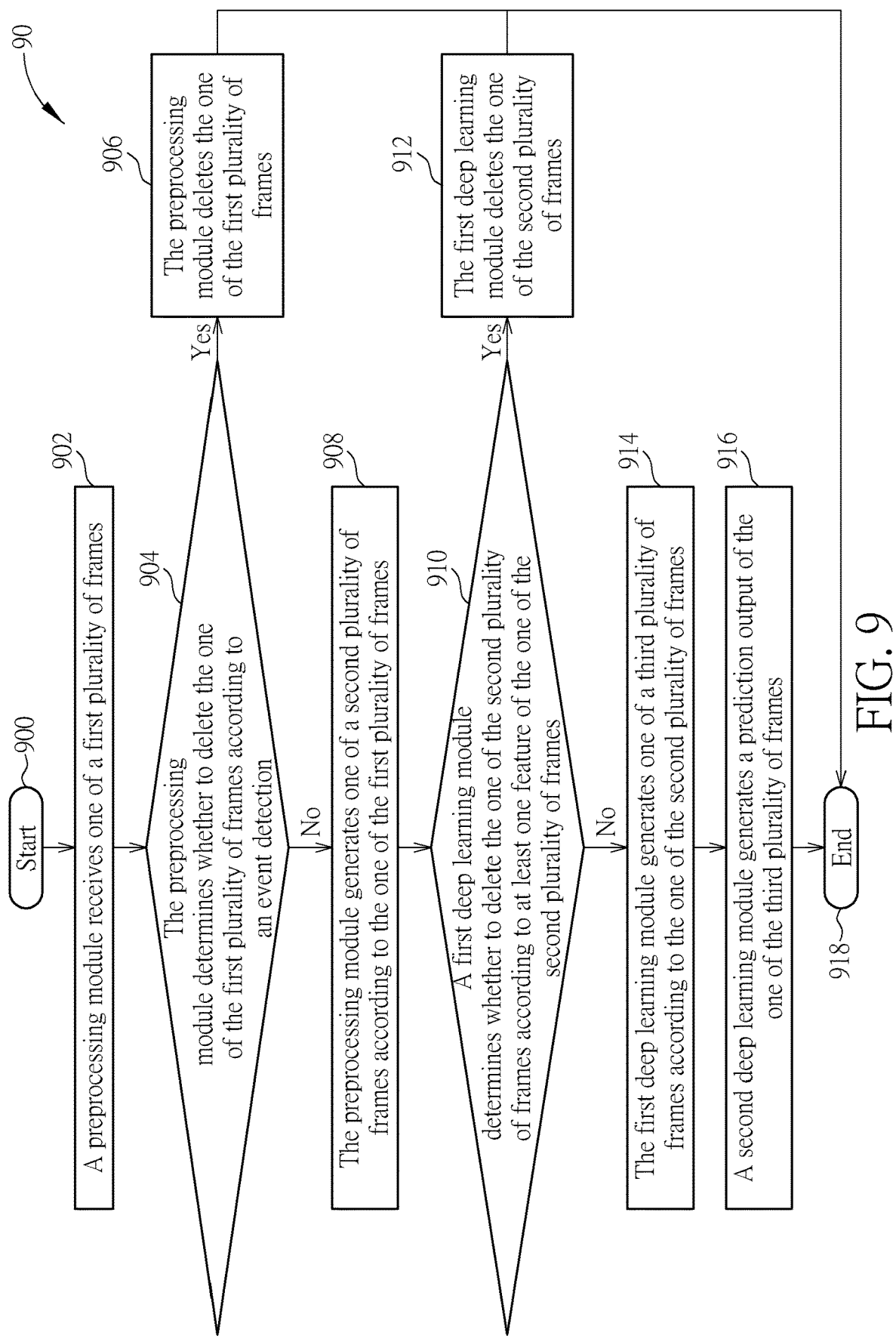
FIG. 9 is a flowchart of a process according to an example of the present invention.

Operations of the computing device 10 in the above examples can be summarized into a process 90 shown in FIG. 9. The process 90 is utilized in the computing device 10, and includes the following steps:

Step 900: Start.

Step 902: A preprocessing module receives one of a first plurality of frames.

Step 904: The preprocessing module determines whether to delete the one of the first plurality of frames according to an event detection. If yes, perform Step 906; otherwise, go to Step 908.

Step 906: The preprocessing module deletes the one of the first plurality of frames.

Step 908: The preprocessing module generates one of a second plurality of frames according to the one of the first plurality of frames.

Step 910: A first deep learning module determines whether to delete the one of the second plurality of frames according to at least one feature of the one of the second plurality of frames. If yes, perform Step 912; otherwise, go to Step 914.

Step 912: The first deep learning module deletes the one of the second plurality of frames.

Step 914: The first deep learning module generates one of a third plurality of frames according to the one of the second plurality of frames.

Step 916: A second deep learning module generates a prediction output of the one of the third plurality of frames.

Step 918: End.

The operation of "delete" described above may be replaced by the operation of "drop". The operation of "determine" described above may be replaced by the operation of "identify", "distinguish", "decide", "confirm" or "discriminate".

Those skilled in the art should readily make combinations, modifications and/or alterations on the abovementioned description and examples. The abovementioned preprocessing module, deep learning modules, description, functions, modules and/or processes including suggested steps can be realized by means that could be hardware, software, firmware (known as a combination of a hardware device and computer instructions and data that reside as read-only software on the hardware device), an electronic system, or combination thereof.

Examples of the hardware may include analog circuit(s), digital circuit (s) and/or mixed circuit (s). For example, the hardware may include application-specific integrated circuit (s) (ASIC(s)), field programmable gate array(s) (FPGA(s)), programmable logic device(s), coupled hardware components or combination thereof. In one example, the hardware includes general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include Subscriber Identity Module (SIM), Read-Only Memory (ROM), flash memory, Random Access Memory (RAM), CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module(s), the hardware and/or the electronic system to perform the related steps.

To sum up, the present invention provides a computing device for handling video content analysis (e.g., railroad component anomaly detection, person Re-ID and traffic monitoring). Modules with low computational complexity delete unimportant frames of a video. Then, a module with high computational complexity processes the rest frames (e.g., important frames) of the video. Thus, computational complexity of hardware is reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A computing device for handling video content analysis, comprising:
a preprocessing module, for receiving a first plurality of frames and for determining whether to delete at least one of the first plurality of frames according to an event detection, to generate a second plurality of frames according to the determination for the first plurality of frames;
a first deep learning module, coupled to the preprocessing module, for receiving the second plurality of frames and for determining whether to delete at least one of the second plurality of frames according to a plurality of features of the second plurality of frames, to generate a third plurality of frames according to the determination for the second plurality of frames; and
a second deep learning module, coupled to the first deep learning module, for receiving the third plurality of frames, to generate a plurality of prediction outputs of the third plurality of frames.

2. The computing device of claim 1, further comprising:
an adaptive buffer, coupled to the second deep learning module, for storing the plurality of prediction outputs, wherein a size of the adaptive buffer is determined according to a number of at least one frame comprising an event, and the at least one frame is comprised in the first plurality of frames.

3. The computing device of claim 1, wherein the first plurality of frames are generated for a streaming or a video.

4. The computing device of claim 1, wherein the event detection comprises at least one of a motion detection and an object detection.

5. The computing device of claim 1, wherein the preprocessing module processes one of the first plurality of frames, if the one of the first plurality of frames is determined not to be deleted.

6. The computing device of claim 5, wherein the operation of processing the one of the first plurality of frames comprises at least one of a noise reduction, a downscaling operation, an adaptive histogram equalization, an image quality enhancement and a cropping operation.

7. The computing device of claim 1, wherein a first time period between the preprocessing module receiving the first plurality of frames and generating the second plurality of frames is smaller than a second time period between the first deep learning module receiving the second plurality of frames and generating the third plurality of frames.

8. The computing device of claim 1, wherein a second time period between the first deep learning module receiving the second plurality of frames and generating the third plurality of frames is smaller than a third time period between the second deep learning module receiving the third plurality of frames and generating the plurality of prediction outputs.

9. The computing device of claim 1, wherein a first time period between the preprocessing module receiving the first plurality of frames and generating the second plurality of frames is equal to or smaller than a fourth time period between successive frames of the first plurality of frames.

10. The computing device of claim 1, wherein a second time period between the first deep learning module receiving the second plurality of frames and generating the third plurality of frames is equal to or smaller than a fourth time period between successive frames of the first plurality of frames.

11. The computing device of claim 1, wherein computational complexity of the preprocessing module is smaller than computational complexity of the second deep learning module.

12. The computing device of claim 1, wherein computational complexity of the first deep learning module is smaller than computational complexity of the second deep learning module.

13. The computing device of claim 1, wherein the first deep learning module and the second deep learning module are convolutional neural networks (CNNs).

14. The computing device of claim 13, wherein the CNNs comprise at least one of a convolution layer, a max pooling layer, an activation function layer and a fully connected layer.

15. The computing device of claim 1, wherein the plurality of prediction outputs are one-hot vectors.

16. The computing device of claim 1, wherein the plurality of prediction outputs are for indicating whether an event of the third plurality of frames is an anomaly.

17. The computing device of claim 1, wherein the plurality of prediction outputs are for tracking an event of the third plurality of frames.

18. The computing device of claim 1, wherein the plurality of prediction outputs are for counting a number of an event of the third plurality of frames.

* * * * *